(12) United States Patent
Amano et al.

(10) Patent No.: US 8,807,304 B2
(45) Date of Patent: Aug. 19, 2014

(54) VIBRATION DAMPING DEVICE

(75) Inventors: Hiroyuki Amano, Susono (JP); Makoto Funahashi, Gotenba (JP); Yoshinobu Kuroyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 12/521,339

(22) PCT Filed: Dec. 18, 2007

(86) PCT No.: PCT/JP2007/074772
§ 371 (c)(1),
(2), (4) Date: Jun. 26, 2009

(87) PCT Pub. No.: WO2008/084667
PCT Pub. Date: Jul. 17, 2008

(65) Prior Publication Data
US 2010/0314210 A1  Dec. 16, 2010

(30) Foreign Application Priority Data

Dec. 26, 2006  (JP) ................... 2006-350321

(51) Int. Cl.
*F16F 7/10* (2006.01)
(52) U.S. Cl.
USPC ........................................... 188/378
(58) Field of Classification Search
CPC .................. F16F 7/14; F16F 7/10; F16F 1/16
USPC ................. 188/378, 379; 267/182, 41; 174/42
See application file for complete search history.

(56) References Cited

U.S. PATENT DOCUMENTS

| 1,675,391 A | * | 7/1928 | Stockbridge | 174/42 |
| 2,469,167 A | * | 5/1949 | Little | 174/42 |
| 3,327,048 A | * | 6/1967 | Petter | 174/42 |
| 3,397,857 A | * | 8/1968 | Schlein | 248/63 |
| 3,432,610 A | * | 3/1969 | Claren | 174/42 |
| 3,584,133 A | * | 6/1971 | Claren | 174/42 |

(Continued)

FOREIGN PATENT DOCUMENTS

| JP | 62 143841 | 6/1987 |
| JP | 1 264519 | 10/1989 |

(Continued)

*Primary Examiner* — Xuan Lan Nguyen
(74) *Attorney, Agent, or Firm* — Oblon, Spivak, McClelland, Maier & Neustadt, L.L.P.

(57) ABSTRACT

A vibration damping device capable of achieving sufficient vibration damping effect utilizing members for converting kinetic energy into thermal energy. In the vibration damping device, a plurality of members is attached to an object to be vibrated in a manner to displace relatively while being contacted with each other, and vibrations of the vibrating object is damped by converting kinetic energy resulting from the vibrations of the object into thermal energy by the relative displacement of the plurality of members. The vibration damping device includes a tightening member, which is attached to the plurality of members to tighten the plurality of members so as to increase frictional force among the plurality of members.

3 Claims, 4 Drawing Sheets

(56) References Cited

U.S. PATENT DOCUMENTS

| | | | |
|---|---|---|---|
| 3,659,034 A * | 4/1972 | Rawlins et al. | 174/42 |
| 3,711,624 A * | 1/1973 | Dulhunty | 174/42 |
| 3,755,613 A * | 8/1973 | Kidder | 174/42 |
| 4,620,060 A * | 10/1986 | Perinetti | 174/42 |
| 4,708,942 A | 11/1987 | Nishiii et al. | |
| 5,000,430 A * | 3/1991 | Smith | 267/273 |
| 5,158,162 A * | 10/1992 | Fink et al. | 188/378 |
| 5,690,322 A * | 11/1997 | Hay | 267/148 |
| 6,494,679 B1 | 12/2002 | Gadre et al. | |
| 6,802,405 B2 * | 10/2004 | Barcock et al. | 188/268 |
| 6,943,290 B2 * | 9/2005 | Dulhunty | 174/42 |

FOREIGN PATENT DOCUMENTS

| | | |
|---|---|---|
| JP | 9 67877 | 3/1997 |
| JP | 10 331892 | 12/1998 |
| JP | 2000 328811 | 11/2000 |
| JP | 2000 353880 | 12/2000 |
| JP | 2001 82544 | 3/2001 |
| JP | 2003 328590 | 11/2003 |

* cited by examiner

VIBRATION DAMPING DEVICE

TECHNICAL FIELD

This invention relates to a vibration damping device for damping vibrations of a vibrating object using a member which can convert a kinetic energy resulting from the vibration of the object into a thermal energy.

BACKGROUND ART

A technique for suppressing or damping vibrations of the vibrating object by absorbing an energy resulting from the vibrations of the vibrating object using a cable or wire attached to the object is widely known in the prior art. For example, Japanese Patent Laid-Open No. 2003-328590 discloses a device for damping vibrations of a hollow tower like structure such as a lamppost or lightning rod. According to the structure with the damping device taught by the Japanese Patent Laid-Open No. 2003-328590, a top end of a cable is fixed to be suspended in a hollow portion of the tower like structure, or a lower end of the cable is fixed in the hollow portion of the tower like structure. Therefore, according to the teachings of Japanese Patent Laid-Open No. 2003-328590, the cable collides against the inner wall of the tower like structure when the tower like structure vibrates so that the vibrations of the tower like structure can be damped.

Japanese Patent Laid-Open No. 2000-353880 discloses a damper comprising an elastic string member to be suspended from an objective structure. Specifically, the string member is a cable made of a plurality of twisted strands. According to the damper for the structure taught by Japanese Patent Laid-Open No. 2000-353880, for example, in case of occurrence of an earthquake, vibrations of the structure can be damped by absorbing energy of an earthquake by the cable. As described, the cable is made of twisted strands. Therefore, according to the teachings of Japanese Patent Laid-Open No. 2000-353880, an optimal damping coefficient can be obtained through friction among the strands resulting from the vibrations and deformations of the cable.

Japanese Utility Model Laid-Open No. 62-143841 discloses a cable vibration damping device, in which an auxiliary wire made of strands having a natural frequency identical to that of a bridge cable is arranged along the bridge cable.

As taught by aforementioned Japanese Patent Laid-Open No. 2003-328590 or Japanese Utility Model Laid-Open No. 62-143841, kinetic energy resulting from vibrations of the moving object is absorbed by the liner material such as a cable or wire made of twisted wire materials attached to a vibrating object, in other words, friction (or frictional heat) is generated inside of the liner material by the kinetic energy. That is, the kinetic energy is converted into thermal energy and the vibration of the vibrating object is thereby damped.

According to the aforementioned conventional vibration damping systems using the wire member, the wire member has to be elongated or thickened to increase a diameter (or a sectional area) thereof in order to damp vibrations more effectively. However, the wire member may be limited to be elongated or thickened. For example, in case of damping vibrations of a transmission case or a transmission cover of a vehicle, the length or the thickness of the wire member has to be limited due to structural constraint of the vehicle, that is, has to be limited within the range not to cause any interference with other components or members when the wire member is vibrated and deformed. For this reason, it is difficult to damp vibrations sufficiently by the conventional vibration damping systems.

DISCLOSURE OF THE INVENTION

The present invention has been conceived noting the technical problems thus far described, and its object is to provide a vibration damping device capable of damping vibration sufficiently utilizing a member for converting kinetic energy into thermal energy.

In order to achieve the above-mentioned object, according to the present invention, there is provided a vibration damping device, in which a plurality of members is attached to an object to be vibrated in a manner to displace relatively while being contacted with each other, and vibrations of the vibrating object is damped by converting kinetic energy resulting from the vibrations of the object into thermal energy by the relative displacement of the plurality of members; characterized by comprising: a tightening member, which is attached to the plurality of members to tighten the plurality of members so as to increase frictional force among the plurality of members.

The aforementioned tightening member increases the frictional force by applying a tightening force to the plurality of members from an outer circumferential side of the plurality of members.

Specifically, according to the present invention, the plurality of members includes a wire member made of wire materials deformable when vibrated. One of the end portions of the wire member is fixed to the object to be vibrated, and the tightening member is attached to at least one of the end portions of the wire member.

That is, according to the present invention, the tightening member is attached to the wire member at a fixed end side of the wire member where the wire member is fixed with the object to be vibrated.

Alternatively, according to the present invention, the tightening member may be attached to the wire member at a free end side of the wire member where the wire member is not fixed with the vibrating object.

In addition to above, according to the present invention, a spindle of a predetermined mass is attached to the free end of the wire member to increase bending moment acting on the wire member when the vibrating object is vibrated.

More specifically, according to the present invention, the tightening member is attached to an outer circumference of the plurality of members.

Thus, according to the present invention, the kinetic energy (i.e., vibration energy) acts on the plurality of members attached to the object in the form of bending moment or shearing force, when the object is vibrated. Consequently, the plurality of members is displaced relatively amongst each other. As described above, the plurality of members is contacted with each other and frictional force is interposed therebetween. Therefore, when the plurality of members is displaced relatively, frictional heat is generated. This means that the kinetic energy of the vibrating object is consumed while being converted into the thermal energy. As a result, the kinetic energy of the vibrating object is reduced so that the vibration is damped. Moreover, according to the vibration damping device of the present invention, the frictional force among the plurality of members is increased by the tightening member tightening the plurality of members. For this reason, an amount of the kinetic energy to be consumed while being converted into the thermal energy can be increased. As a result, the vibrations of the vibrating object can be damped effectively.

As described, according to the present invention, the frictional force among the plurality of members can be increased easily by tightening the plurality of members from the outer circumferential side of the plurality of members using the tightening member. Therefore, the vibrations of the vibrating object can be damped easily and effectively.

As also described above, according to the present invention, the plurality of members includes the wire member. For example, the wire member is made of strand wires to be used for a wire rope, an electric wire etc., by bundling or twisting the strand wires and holding the bundled or twisted wires. Here, the strand wires are deformable when vibrated. One of the end portions of the wire member is fixed to the object, and the tightening member is attached at least one of the end portions of the wire member. Therefore, the frictional force among the plurality of wires is increased at the portion to which the tightening member is attached. For this reason, when the object is vibrated, the wires constituting the wire member are displaced relatively amongst each other by the bending moment acting on the wire member or the shearing force acting among the wires, and as a result, heat is generated by the friction among the wires. That is, when the object is vibrated, the wire member fixed with the vibrating object at one of the end portions thereof is deformed and the frictional heat is generated inside of the wire member. As a result, the kinetic energy of the vibrating object is consumed while being converted into the thermal energy. For this reason, the vibrations of the vibrating object can be damped easily and effectively.

Moreover, according to the present invention, the tightening member for tightening the wire members to increase the frictional force among the wires is attached to the wire member at the fixed end side where the wire member is fixed with the vibrating object. As a result, the frictional force in the wire member is increased at the fixed end side. Specifically, the fixed end side of the wire member is the portion on which the maximum bending moment is acting when the object is vibrating. Therefore, the friction in the wire member resulting from the vibration of the object can be increased by attaching the tightening member to the fixed end portion of the wire member. For this reason, the amount of the kinetic energy to be consumed while being converted into the thermal energy can be increased. As a result, the vibrations of the vibrating object can be damped easily and effectively.

Alternatively, according to the present invention, the tightening member for tightening the wire members to increase the frictional force among the wires can be attached to the wire member at the free end side of the wire member where the wire member is not fixed with the vibrating object. As a result, the frictional force in the wire member is increased at the free end side. On the other hand, the frictional force in the wire member can also be increased at the fixed end side by increasing the bending moment resulting from the vibration of the object and acting on the fixed end side. In addition, a total length of the wire member can be shortened by setting a mass of the tightening member attached to the free end side of the wire member to correspond to a mass required to increase the bending moment to act on the fixed end side of the wire member. In other word, the tightening member having a predetermined mass appropriate to increase the bending moment to act on the wire member when the object is vibrated is attached to the free end side of the wire member. The vibration damping effect of this case is comparable to the case in which the tightening member is attached to the fixed end side of the wire member, and the wire member has a length appropriate to increase the bending moment to act thereon when the object is vibrated. As a result, consumption of the kinetic energy converted into thermal energy can be increased effectively so that the vibrations of the vibrating object can be damped easily and effectively.

Further, according to the present invention, a spindle having a predetermined mass appropriate to increase the bending moment to act on the wire member when the object is vibrated can also be attached to the free end side of the wire member. As a result, the bending moment to act on the fixed end side of the wire member can be increased so that the frictional force in the wire member is increased at the free end side. In addition, a total length of the wire member can be shortened by setting a mass of the spindle attached to the free end side of the wire member to correspond to a mass required to increase the bending moment to act on the fixed end side of the wire member. In other word, the spindle having a predetermined mass appropriate to increase the bending moment to act on the wire member when the object is vibrated is attached to the free end side of the wire member. The vibration damping effect of this case is comparable to the case in which the spindle is attached to the fixed end side of the wire member, and the wire member has a length appropriate to increase the bending moment to act thereon when the object is vibrated. As a result, consumption of the kinetic energy converted into thermal energy can be increased effectively so that the vibrations of the vibrating object can be damped easily and effectively.

In addition to above, according to the present invention, the tightening member for tightening the plurality of members (i.e., the plurality of wires in the above-explained case) to increase the frictional force among the members is attached to an outer circumference of the plurality of members. Therefore, the plurality of members can be tightened easily from the outer circumference thereof to increase the frictional force therebetween. As a result, the vibrations of the vibrating object can be damped easily and effectively.

BEST MODE FOR CARRYING OUT THE INVENTION

FIRST EXAMPLE

Figure 1:
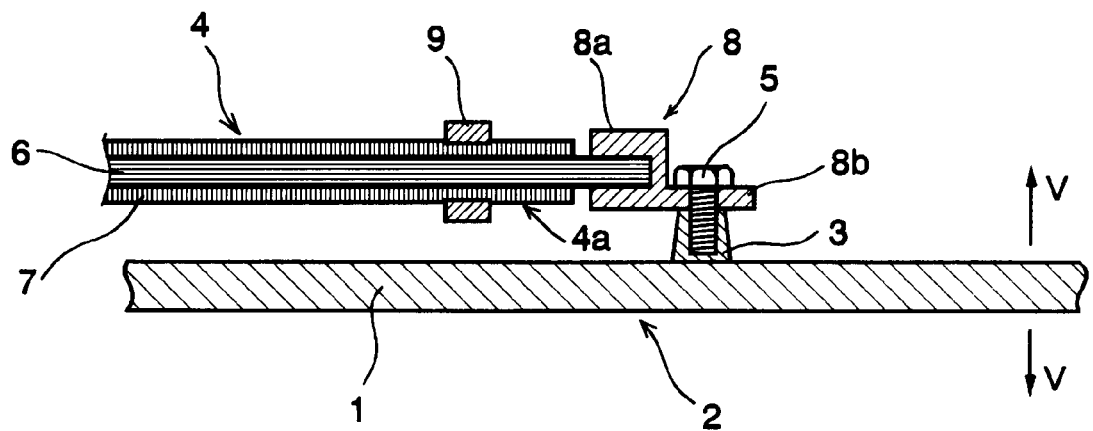
FIG. 1 is a view schematically showing a configuration of a first example of the present invention.

Next, this invention will be explained with reference to the accompanying drawings. FIG. 1 is a view schematically showing a first example of the vibration damping device of the present invention. In the example shown in FIG. 1, an object 1 is a transmission case to be mounted on a vehicle.

As shown in FIG. 1, a boss portion 3 is formed or fixed integrally with an object 1 to be vibrated mainly in the direction specified by arrows V in FIG. 1 (i.e., a vertical direction in FIG. 1). For example, the boss portion 3 is formed integrally with the object 1 on a portion 2 by casting, or fixed integrally with the object 1 on the portion 2 by welding or bonding.

A wire member 4 is fixed integrally with the boss portion 3 of the transmission case 1 by a bolt 5. For example, an insulated electric or communication wire (i.e., a lead wire), or a wire rope can be used as the wire member 4. In this example, an insulated lead wire covered by vinyl or polyethylene is used as the wire member 4.

The wire member 4 comprises a plurality of bundled or twisted flexible or deformable wires (or strings) 6 made of copper or aluminum, and a covering member 7 made of vinyl or polyethylene resin covering an outer face of the bundled or twisted wires. Therefore, the wire member 4 can be deformed elastically or plastically by an external load applied thereto. The wire member 4 further comprises a clasp member 8 attached to one of end portions thereof (e.g., right end in FIG. 1). The clasp member 8 is fixed to the boss portion 3 by a bolt 5 so that the wire member 4 is attached to the transmission case 1.

The clasp member 8 is a known crimp terminal used for wiring a lead wire, and the clasp member 8 comprises a cylindrical connecting portion 8a into which a leading end of the wire member 4 is inserted, and a terminal portion 8b into which a stem of the bolt 5 is inserted. The cylindrical connecting portion 8a is tightened or caulked while holding one of the leading ends of the wire member 4 so that the clasp member 8 is fixed with the wire member 4.

As a result of fixing the connecting portion 8a with the leading end of the wire member 4, the wires 6 held in the connecting portion 8a are tightened from the outer circumferential side of the wire member 4. That is, a frictional force among the wire members 6 is increased according to rise in the tightening force tightening the wires 6, as expressed by the following equation:

$$F = \mu \cdot N.$$

In the above equation, N represents the tightening force tightening the wires 6, μ represents a coefficient of friction among the wires 6, and F represents the frictional force among the wire members 6. Thus, the wires 6 are tightened by the connecting portion 8a of the clasp member 8 at the leading end of the wire member 4, and the frictional force among the wires 6 is increased in the connecting portion 8a.

Figure 7:
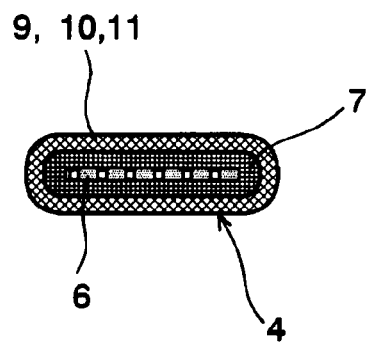
FIG. 7 is a cross sectional view schematically showing a cross section of a portion where the wire member is caulked by the pressing member.

In this example, a tightening member 9 is attached to the wire member 4 at an end portion 4a. Specifically, the tightening member 9 is attached to the wire member 4 at a side in which the clasp member 8 is fixed, that is, at a fixed end side (i.e., the right side in FIG. 1) of the wire member 4. The tightening member 9 is formed into a cylindrical shape likewise the connecting portion 8a of the clasp member 8 so that the wire member 4 can be inserted therein from a leading end of the end portion 4a. The cylindrical tightening member 9 holding the wire member 4 is tightened or caulked at the end portion 4a to be fixed with the wire member 4. Here, a cross section of the wire member 4 after caulked is shown in FIG. 7.

The tightening force tightening the wires 6 is thus increased at the end portion 4a from the outer circumferential side of the wire member 4, by fitting the tightening member 9 onto the end portion 4a of the wire member 4. As a result, the frictional force among the wires 6 is increased, likewise the aforementioned portion tightened by the connecting portion 8a of the clasp member 8. That is, the frictional force among the wires 6 is increased at the end portion 4a by tightening the wires 6 using the tightening member 9.

Thus, the tightening member 9 and the connecting portion 8a of the clasp member 8 function as the tightening member of the present invention for tightening the wires 6 as strings to increase the frictional force among the wires 6.

The wire member 4 thus fixed with the transmission case 1 at its leading end through the clasp member 8 has a predetermined length and a mass. Therefore, in case the transmission case 1 is vibrated in the direction specified by the arrows V, the vibration of the transmission case 1 is transmitted to the wire member 4 through the boss portion 3 and the clasp member 8. As a result, the wire member 4 is vibrated together with the transmission case 1. In this situation, the wire member 4 is deformed by cyclic load resulting from the vibration. More specifically, in case the transmission case 1 is being vibrated, a bending moment is generated in the wire member 4 by the cyclic load arising from the vibrating energy (i.e., kinetic energy). Consequently, the wire member 4 is deformed according to a direction and magnitude of the bending moment.

When the wire member 4 is thus deformed by the bending moment acting thereon, the wires 6 are displaced relatively amongst each other in the deformed portion of the wire member 4. As explained above, the wires 6 are held in the covering member 7 while being bundled or twisted to be contacted with each other. Therefore, in case the wire member 4 is deformed by the bending moment acting thereon, the wires 6 are displaced relatively amongst each other in the wire member 4, and as a result, frictional heat is generated by the frictional force among the wires 6 resulting from such relative displacement of the wires 6. That is, the kinetic energy resulting from the vibration of the transmission case 1 is consumed while being converted into thermal energy in the wire member 4. For this reason, the kinetic energy resulting from the vibration of the transmission case 1 is reduced, and the vibration of the transmission case 1 is thereby damped.

As described above, in the first example, the tightening member 9 and the connecting portion 8a are attached to the end portion 4a of the wire member 4, and the wires 6 are tightened to increase the frictional force thereamong at the portions where the tightening member 9 and the connecting portion 8a are attached. Therefore, when the transmission case 1 is vibrated, an amount of the frictional heat generated as a result of the deformation of the wire 4 can be increased in comparison with the heat amount of a case in which the tightening member 9 is not attached to the wire member 4. In other words, an energy amount to be consumed by converting the kinetic energy (i.e., vibrations) of the transmission case 1 into the thermal energy in the wire member 4 can be increased. That is, the vibrations of the transmission case 1 can be damped efficiently.

SECOND EXAMPLE

Figure 2:
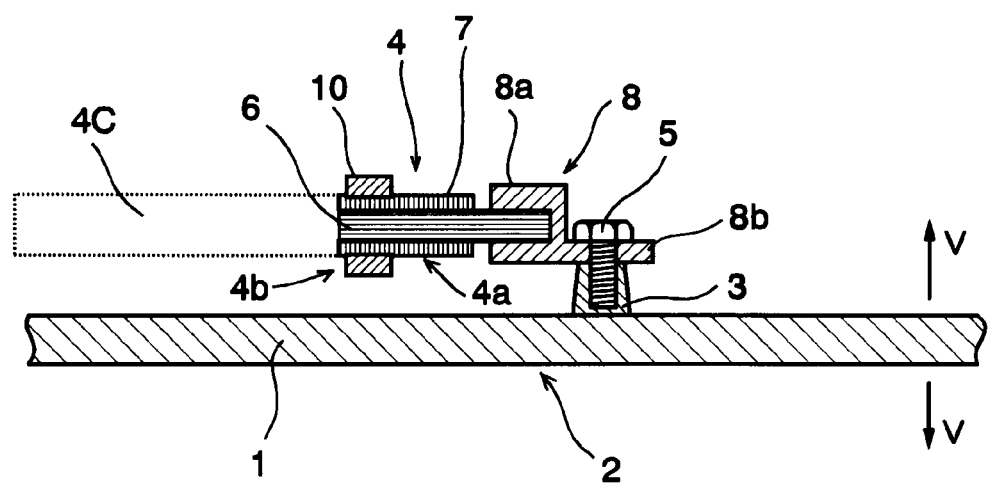
FIG. 2 is a view schematically showing a configuration of a second example of the present invention.

The second example of the vibration damping device according to the present invention is schematically shown in FIG. 2. In the second example, the structure of the vibration damping device according to the first example shown in FIG. 1 is altered partially. The remaining configurations of the vibration damping device are identical to those of the example shown in FIG. 1, so further explanation about the remaining elements will be omitted by allotting common reference numerals.

As can be seen from FIG. 2, the tightening member 10 is attached to the wire member 4 at an end portion 4b. Specifically, the tightening member 10 is attached to the wire member 4 at a side in which the clasp member 8 is not fixed, that is, at a free end side (i.e., the left side in FIG. 2) of the wire member 4. The tightening member 10 is formed into a cylindrical shape likewise the tightening member 9 and the connecting portion 8a of the clasp member 8 so that the wire member 4 can be inserted therein from the other leading end, that is, a rear end (i.e., left end in FIG. 2) of the wire member 4. The cylindrical tightening member 10 holding the wire member 4 is tightened or caulked at the end portion 4b to be fixed with the wire member 4. As described, a cross section of the wire member 4 after caulked is shown in FIG. 7.

The tightening force tightening the wires 6 is thus increased at the end portion 4b from the outer circumferential side of the wire member 4, by fixing the tightening member 10 with the wire member 4 at the end portion 4b. As a result, the frictional force among the wires 6 is increased. That is, the frictional force among the wires 6 is increased at the end portion 4b by tightening the wires 6 by the tightening member 10.

Thus, the tightening member 10 functions as the tightening member of the present invention for tightens the wires 6 as strings to increase the frictional force among the wires 6.

In addition, the length of the wire member 4 can be shortened as shown in FIG. 2. Specifically, in order to achieve the vibration damping effect comparable to that of the case in which an unshortened wire 4 is attached to the transmission case 1, the tightening member 10 is adjusted to have a mass corresponding to a mass of a predetermined shortened length 4c of the wire member 4.

The bending moment to act on the wire member 4 when the transmission case 1 is vibrated is varied according to a total length of the wire member 4 and a mass thereof, more specifically, according to a length from the portion where the clasp member 8 is fixed with the transmission case 1 to the leading end of the free end and a mass of this portion. That is, the bending moment arising from vibrations of the transmission case 1 can be increased by elongating the length of the wire member 4 to be attached to the transmission case 1, or by adding an appropriate mass to the wire member 4. When the bending moment acting on the wire member 4 is increased, the frictional heat generated in the wire member 4 with respect to the vibrations is increased. In other words, an amount of converting the kinetic energy into the thermal energy is increased when the transmission case 1 is vibrated.

Thus, the vibration damping effect using the wire member 4 can be enhanced by elongating the length of the wire member 4. However, an objective of this example is to damp the vibrations of the transmission case 1. Therefore, a space to install the wire member 4 is limited, and the wire member 4 may interfere with other members when vibrated to be deformed. For the reasons above, the length of the wire member 4 is preferably as short as possible. According to the second example, therefore, the predetermined length 4c can be eliminated from the total length of the wire member 4 by attaching the tightening member 10 adjusted to have a mass corresponding to a mass of the length 4c to the free end 4b of the wire member 4.

That is, even if the length of the wire member 4 is thus shortened in the amount of the length 4c, the vibration damping device of the second example is still capable of achieving the vibration damping effect comparable to that of the first example in which the wire 4 is not shortened and tightened by the tightening member 9 at its fixed end side. In other words, the wire 4 can be shortened in the amount of the length 4c without degrading the vibration damping effect thereof, by attaching the tightening member 10 being adjusted to have a mass corresponding to a mass of the length 4c, to the free end 4b of the wire member 4.

Moreover, the frictional force among the wires 6 is increased by the tightening member 10 at the end portion 4b, as explained above. Therefore, more frictional heat can be generated when the wire member 4 is deformed by the vibration of the transmission case 1, in comparison with the heat generating amount of the case in which the tightening member 10 is not attached to the wire member 4. In other words, the amount of the kinetic energy (i.e., vibrations) of the transmission case 1 to be consumed in the wire member 4 while being converted into the thermal energy can be increased. For this reason, the vibrations of the transmission case 1 can be damped effectively.

Figure 9:
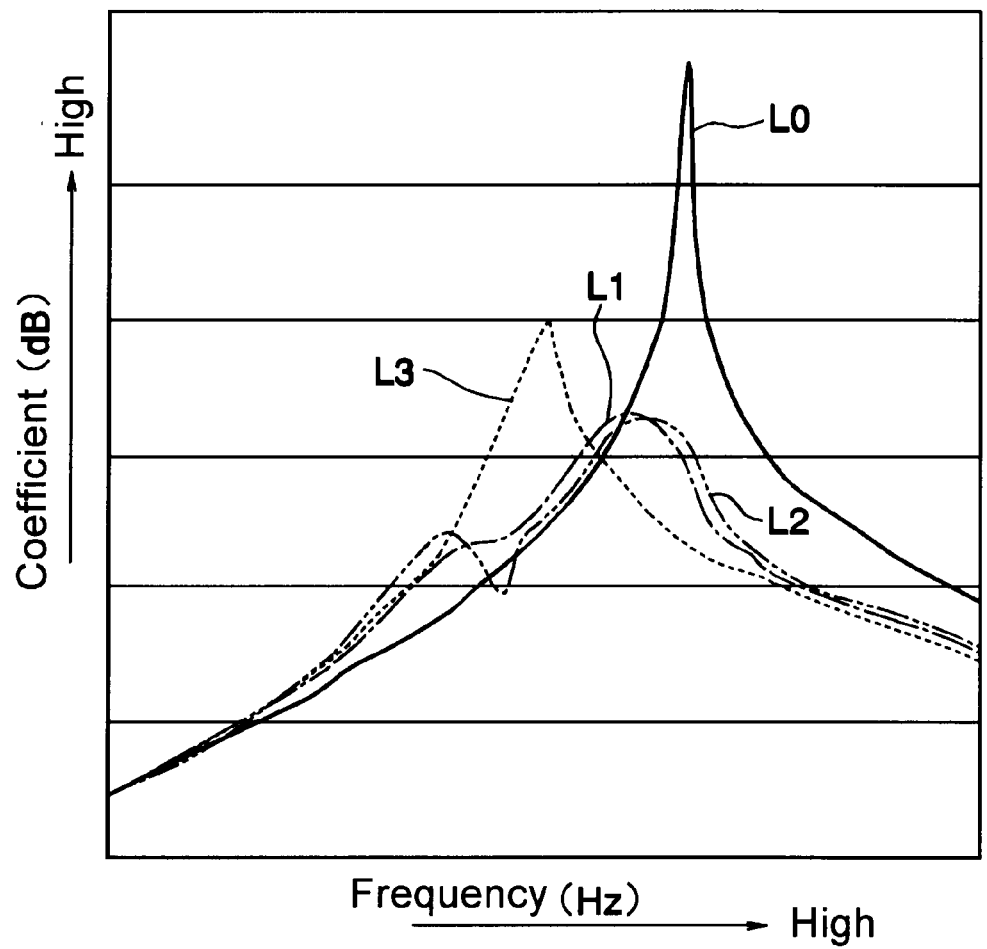
FIG. 9 is a graph indicating one example of an experimental result for validating the vibration damping effect of the vibration damping device of the present invention.

FIG. 9 is a graph indicating one example of an experimental result for validating the vibration damping effect of the vibration damping device of the present invention. In FIG. 9, the solid line L0 represents a vibration measurement result of the object 1 in case the vibration damping device of the present invention is not used, the dashed-dotted line L1 represents a vibration measurement result of the object 1 in case the vibration damping device of the first example is used, the dashed-two dotted line L2 represents a vibration measurement result of the object 1 in case the vibration damping device of the second example is used, and the broken line L3 represents a vibration measurement result of the object 1 in case the tightening member 9 is not attached to the wire member 4 in the first example (i.e., in case only the wire member 4 is attached to the object 1). As can be seen from FIG. 9, a certain degree of vibration damping effect can be achieved even in the case in which only the wire member 4 is attached to the object 1, in comparison with the case in which the vibration damping device of the present invention is not used. As also can be seen from FIG. 9, the vibration damping effect is further improved in case the wire member 4 to which the tightening member 9 or 10 is attached is used. In addition, the vibration damping effect of the second example in which the length of the wire member 4 is shortened is almost comparable to that of the first example in which the length of the wire member 4 is not shortened.

THIRD EXAMPLE

Figure 3:
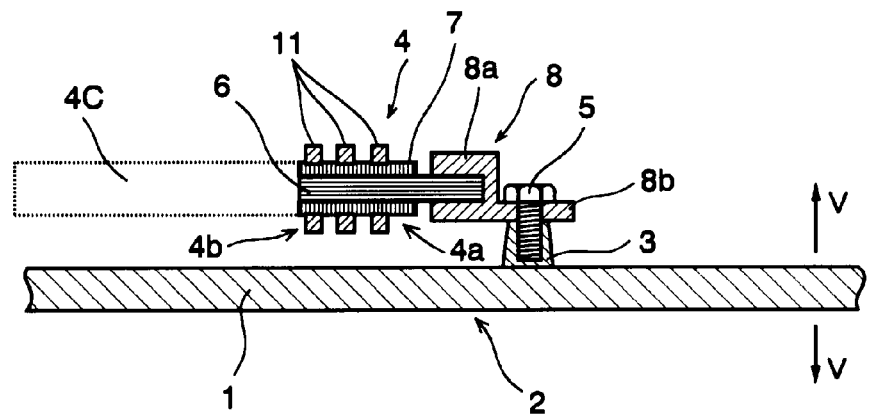
FIG. 3 is a view schematically showing a configuration of a third example of the present invention.

The third example of the vibration damping device according to the present invention is schematically shown in FIG. 3. In the third example, the structure of the vibration damping device according to the second example shown in FIG. 2 is altered partially. The remaining configurations of the vibration damping device are identical to those of the example shown in FIG. 2, so further explanation about the remaining elements will be omitted by allotting common reference numerals.

As shown in FIG. 3, a plurality of tightening members 11 is attached to the wire member 4 at the side where the clasp member 8 is not fixed (i.e., left side in FIG. 3), in other words, at the free end side 4b. The tightening member 11 is divided into a plurality of pieces, and each piece is structurally similar to the aforementioned tightening members 9 and 10 and the connecting portion 8a of the clasp member 8. That is, each piece of the tightening member 11 is formed into cylindrical shape so that the wire member 4 can be inserted therein from the leading end of the free end (i.e., the left end in FIG. 3), in other words, from the rear end of the wire member 4. The cylindrical tightening members 11 holding the wire member 4 is tightened or caulked at the end portion 4b to be fixed with the wire member 4. As described, a cross section of the wire member 4 after caulked is shown in FIG. 7.

The tightening force tightening the wires 6 is thus increased at the end portion 4b from the outer circumferential side of the wire member 4, by the tightening members 11 being fixed with the wire member 4. As a result, the frictional force among the wires 6 is increased. That is, the frictional force among the wires 6 is increased at the end portion 4b by tightening the wires 6 using the tightening members 11.

Thus, the tightening members 11 functions as the tightening member of the present invention for tightening the wires 6 as strings to increase the frictional force among the wires 6.

As described, the tightening member is divided into predetermined number of pieces, and those pieces are attached to the wire member 4 at the portions of the wire member 4 within the region not to hinder the deformation of the wire member 4. Therefore, wire member 4 can be deformed by the vibrations of the transmission member 1 even at the portion thereof where the divided pieces of the tightening members 11 are attached. For this reason, the amount of the relative displacement among the wires 6 can be increased so that the frictional force generated there among can be increased. That is, the amount of the kinetic energy (i.e., vibrations) of the transmission case 1 to be consumed in the wire member 4 while being converted into the thermal energy can be increased. For this reason, the vibrations of the transmission case 1 can be damped effectively.

As the second example, the length of the wire member 4 can also be shortened as shown in FIG. 3. Specifically, in order to achieve the vibration damping effect comparable to that of the case in which an unshortened wire 4 is attached to the transmission case 1 (without using the tightening members 11), a total mass of the tightening members 11 is adjusted to correspond to a mass of a predetermined shortened length 4c of the wire member 4.

Therefore, even if the length of the wire member 4 is thus shortened in the amount of the length 4c, the vibration damping device of the third example is still capable of achieving the vibration damping effect comparable to those of previously explained examples. In other words, the wire 4 can be shortened in the amount of the length 4c without degrading the vibration damping effect thereof, by attaching the tightening members 11 being adjusted to have a total mass corresponding to a mass of the length 4c, to the free end 4b of the wire member 4.

Moreover, the frictional force among the wires 6 is increased by the tightening members 11 at the end portion 4b as explained above, therefore, more kinetic energy (i.e., vibrations) of the transmission case 1 can be consumed in the wire member 4 while being converted into the thermal energy. For this reason, the vibrations of the transmission case 1 can be damped effectively.

FOURTH EXAMPLE

Figure 4:
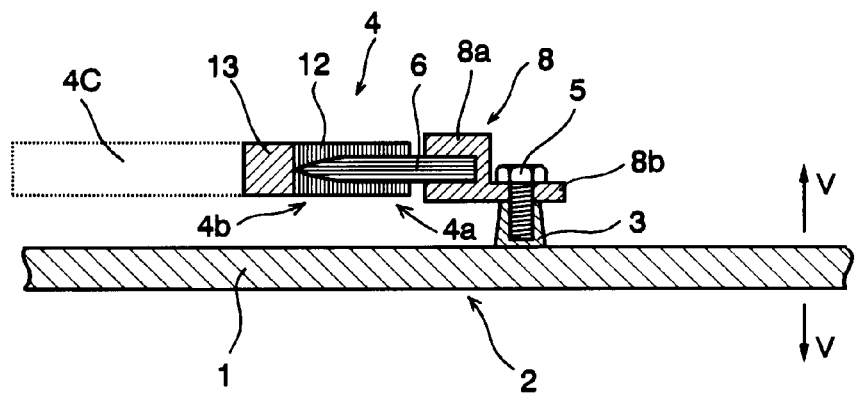
FIG. 4 is a view schematically showing a configuration of a fourth example of the present invention.

The fourth example of the vibration damping device according to the present invention is schematically shown in FIG. 4. In the fourth example, the structure of the vibration damping device according to the second example shown in FIG. 2 is altered partially. The remaining configurations of the vibration damping device are identical to those of the example shown in FIG. 2, so further explanation about the remaining elements will be omitted by allotting common reference numerals.

FIG. 4, shows an example of enhancing the tightening force for tightening the wires 6 constituting the wire 4 by reducing an inner diameter of a covering member 12. Specifically, the inner diameter of the covering member 12 is reduced at the free end 4b side to be thinner than a total diameter of the bundled or twisted wires 6, and the wires 6 are held in the covering member 12. That is, the wires 6 held in the covering member 12 are tightened at the portion of the covering member 12 where the inner diameter is reduced. Therefore, the frictional force among the wires 6 in increased.

Thus, the covering member 12 also functions as a tightening member of the present invention for tightening the wires 6 as strings to increase the frictional force among the wires 6.

As described above, the tightening force for tightening the bundled or twisted wires 6 being held in the covering member 12 is increased from the outer circumferential side by the covering member 12 in which the inner diameter thereof is reduced. As a result, the frictional force among the wires 6 is increased. Thus, the wires 6 are tightened in the covering member 12 at the portion where the inner diameter of the covering member 12 is reduced so that the frictional force among the wires 6 is increased at this portion. For this reason, the amount of the frictional heat generated among the wires 6 can be increased when the wire member 4 is deformed by the vibrations of the transmission case 1. That is, the amount of the kinetic energy (i.e., vibrations) of the transmission case 1 to be consumed in the wire member 4 while being converted into the thermal energy can be increased. For this reason, the vibrations of the transmission case 1 can be damped effectively.

In addition, a spindle 13 is attached to the leading end of the wire member 4 at the side in which the clasp member 8 is not fixed (i.e., left side in FIG. 4), in other words, at the leading end of the free end 4b. For example, the spindle 13 is formed into cylindrical shape, and bonded or welded to the free end 4b. As the second and third examples, the length of the wire member 4 is shortened as shown in FIG. 4. In order to achieve the vibration damping effect comparable to that of the case in which an unshortened wire 4 is attached to the transmission case 1, a total mass of the spindle 13 is adjusted to correspond to a mass of a predetermined shortened length 4c of the wire member 4.

Therefore, even if the length of the wire member 4 is thus shortened in the amount of the length 4c, the vibration damping device of the fourth example is still capable of achieving the vibration damping effect comparable to those of previously explained examples. In other words, the wire 4 can be shortened in the amount of the length 4c without degrading the vibration damping effect thereof, by attaching the spindle 13 being adjusted to have a total mass corresponding to a mass of the length 4c, to the free end 4b of the wire member 4.

FIFTH EXAMPLE

Figure 5:
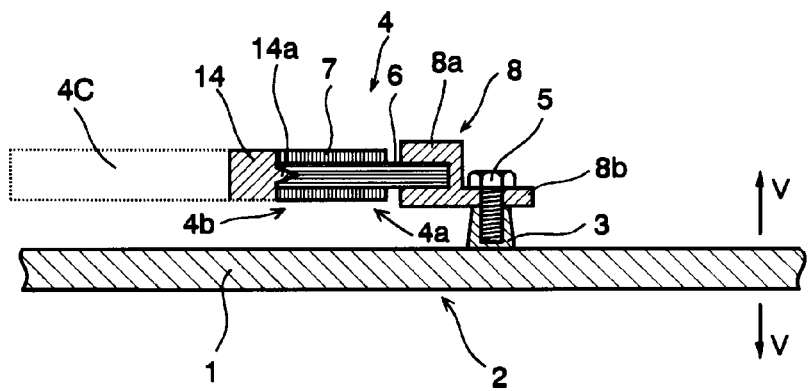
FIG. 5 is a view schematically showing a configuration of a fifth example of the present invention.

The fifth example of the vibration damping device according to the present invention is schematically shown in FIG. 5. In the fifth example, the structure of the vibration damping device according to the second example shown in FIG. 2 is altered partially. The remaining configurations of the vibration damping device are identical to those of the example shown in FIG. 2, so further explanation about the remaining elements will be omitted by allotting common reference numerals.

As shown in FIG. 5, a spindle 14 is attached to the leading end of the wire member 4 at the side in which the clasp member 8 is not fixed (i.e., left side in FIG. 5), in other words, at the leading end of the free end 4b. Likewise the spindle 13 of the fourth example, the spindle 14 is formed into cylindrical shape, and bonded or welded to the free end 4b. As the second and fourth examples, the length of the wire member 4 is shortened as shown in FIG. 5. In order to achieve the vibration damping effect comparable to that of the case in which an unshortened wire 4 is attached to the transmission case 1, a total mass of the spindle 14 is adjusted to correspond to a mass of a predetermined shortened length 4c of the wire member 4.

Therefore, even if the length of the wire member 4 is thus shortened in the amount of the length 4c, the vibration damping device of the fifth example is still capable of achieving the vibration damping effect comparable to those of previously explained examples. In other words, the wire 4 can be shortened in the amount of the length 4c without degrading the vibration damping effect thereof, by attaching the spindle 14 being adjusted to have a total mass corresponding to a mass of the length 4c, to the free end 4b of the wire member 4.

The spindle 14 comprises a protrusion 14a to be inserted into the covering member 7, on an end face thereof to be fixed with the free end 14b of the wire member 4 (i.e., on the end face of the right side in FIG. 5). For example, the protrusion 14a is formed into conical shape to be inserted into the bundled or twisted wires 6 being held in the covering member 7 when fixed to the free end 4b of the wire member 4. That is, as a result of fixing the spindle 14 to the free end 4b of the wire member 4, the wires 6 are wedged between an outer circumferential face of the protrusion 14a and an inner circumferential face of the covering member 7 at the portion where the protrusion 14a is inserted. Therefore, the tightening force of tightening the wires 6 is enhanced so that the frictional force among the wires 6 is increased.

Thus, the protrusion 14a of the spindle 14 also functions as a tightening member of the present invention for tightening the wires 6 as strings to increase the frictional force among the wires 6.

As described above, the tightening force for tightening the bundled or twisted wires 6 being held in the covering member 7 is increased from inside of the wires 6 by the spindle 14 thus having the protrusion 14a. As a result, the frictional force among the wires 6 is increased. Thus, the wires 6 are tightened in the covering member 7 at the portion where the protrusion 14a of the spindle 14 is inserted so that the frictional force among the wires 6 is increased at this portion. For this reason, the amount of the frictional heat generated among the wires 6 can be increased when the wire member 4 is deformed by the vibrations of the transmission case 1. That is, the amount of the kinetic energy (i.e., vibrations) of the transmission case 1 to be consumed in the wire member 4 while being converted into the thermal energy can be increased. For this reason, the vibrations of the transmission case 1 can be damped effectively.

SIXTH EXAMPLE

Figure 6:
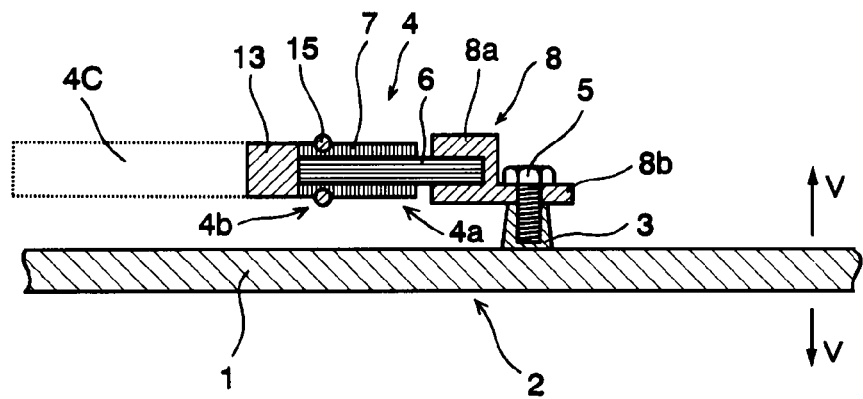
FIG. 6 is a view schematically showing a configuration of a sixth example of the present invention.

The sixth example of the vibration damping device according to the present invention is schematically shown in FIG. 6. In the sixth example, the structure of the vibration damping device according to the second example shown in FIG. 2 is altered partially. The remaining configurations of the vibration damping device are identical to those of the example shown in FIG. 2, so further explanation about the remaining elements will be omitted by allotting common reference numerals.

As shown in FIG. 6, likewise the fourth example, the spindle 13 is attached to the leading end of the wire member 4 at the side in which the clasp member 8 is not fixed (i.e., left side in FIG. 6), in other words, at the leading end of the free end 4b. Therefore, the length of the wire member 4 can also be shortened in the amount of the predetermined shortened length 4c, as shown in FIG. 6. In order to achieve the vibration damping effect comparable to that of the case in which an unshortened wire 4 is attached to the transmission case 1, a total mass of the spindle 14 is adjusted to correspond to a mass of a predetermined shortened length 4c of the wire member 4.

Figure 8:
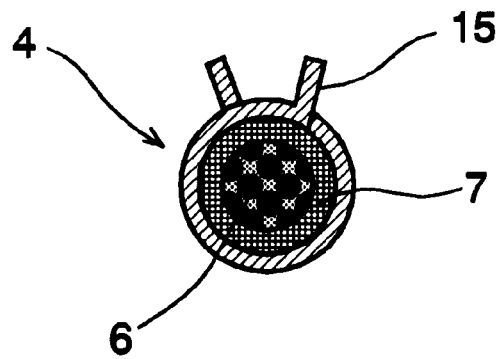
FIG. 8 is a cross sectional view schematically showing a cross section of a portion where the wire material is tightened using a clamp as a tightening member.

In addition, a clamp 15 is attached to the wire member 4 on the side in which the clasp member 8 is not fixed (i.e., left side in FIG. 6), in other words, on the free end 4b side. For example, a metal or resin member shown such as a clip, a hose clamp, a hose band or the like can be used as the clamp member 15. As shown in FIG. 8, the clamp member 15 is attached to the wire member 4 to tighten the wire member 4 from the outer circumferential side.

FIG. 6 shows the example in which only one clamp member 15 is attached to the wire member 4 at the free end 4b side, however, two or more clamp member may be attached to the wire member 4 in an extent or portions not to hinder the deformation of the wire member 4. In this case, the wire member 4 is allowed to be deformed even at the portions to which the plurality of clamp members 15 is attached when the transmission case 15 is vibrated. Therefore, the clamping force for clamping the wire member 4 from the outer circumferential side can be enhanced without restricting the amount of relative displacement among the wires 6 resulting from the deformation of the wire member 4.

The wire member 4 is thus tightened from the outer circumferential side by attaching the clamp member 15 to the wire member 4 at the free end 4b side. As a result, the tightening force for tightening the wires 6 is enhanced from the outer circumferential side at the free end 4b side so that the frictional force among the wires 6 is increased at the free end 4b side. For this reason, the amount of the frictional heat generated among the wires 6 can be increased when the wire member 4 is deformed by the vibrations of the transmission case 1. That is, the amount of the kinetic energy (i.e., vibrations) of the transmission case 1 to be consumed in the wire member 4 while being converted into the thermal energy can be increased. For this reason, the vibrations of the transmission case 1 can be damped effectively.

Thus, the clamp member 15 also functions as a tightening member of the present invention for tightening the wires 6 as strings to increase the frictional force among the wires 6.

Here, the present invention should not be limited to the examples thus far explained. In the above explained examples, the wire member is attached to the object in the direction in which the length direction thereof is perpendicular to the vibrating direction of the object. However, the vibration damping effect of the case in which the object is vibrated in the direction parallel to the length direction of the wire member is comparable to those achieved by the aforementioned examples. Specifically, in case the object is vibrated in the direction parallel to the length direction of the wire member, a shearing force to displace the plurality of wires is applied by the a compressive force, a tensile force and an inertia force acting on the wire member. As a result, the wires are displaced relatively amongst each other, and the frictional heat is thereby generated among the wires. Thus, the kinetic energy of the object can be consumed while being converted into the thermal energy in the wire member eve in case the object is vibrated in the direction parallel to the length direction of the wire member, and the vibration of the object is thereby damped.

In addition, in the above explained examples, the wire member is fixed to the object by the bolt, however, the measure to fix the wire member to the object should not be limited to the bolt. For example, the wire member may also be fixed to the object by a measure possible to propagate the vibrations of the object to the wire member, such as welding, soldering, bonding and so on.

Further, the object of the present invention should not be limited to the transmission case used in the above explained examples. The vibration damping device thus structures can be applied to a portion of all of the objects, members structures to be vibrated.

The invention claimed is:

1. A vibration damping device for damping vibrations of a transmission case mounted on a vehicle, comprising:
    strands prepared by twisting a plurality of wires;
    a clasp member having a cylindrical connecting member that tightens one end of the strands inserted thereto;
    a terminal portion integrated with the clasp member;
    a boss portion formed to protrude from the transmission case to which the terminal portion is fixed;
    a covering member that covers and tightens the strands; and
    a tightening member that tightens the strands from outside through the covering member at a free end side of the strands.

2. A vibration damping device, in which a plurality of members is attached to an object to be vibrated in a manner to displace relatively while being contacted with each other, and vibrations of the vibrating object are damped by converting kinetic energy resulting from the vibrations of the object into thermal energy by the relative displacement of the plurality of members arising from a bending moment acting on the plurality of members, comprising:
    the object, which includes a transmission case mounted on a vehicle;
    the plurality of members in which the members are bundled strands, and one end of the plurality of members is fixed to the object through a clasp member;
    the clasp member, which is comprised of a cylindrical connecting member to which one end of the strands is inserted to be tightened, and a terminal portion that is integrated with the connecting member;
    a boss portion formed to protrude from the transmission case to which the terminal portion is fixed;
    a covering member that covers an outer face of the plurality of members; and
    a plurality of tightening members, which is attached to the plurality of members through the covering member to tighten the plurality of members so as to increase frictional force among the plurality of members when the plurality of members is displaced relatively by a bending moment acting thereon,
    wherein the plurality of tightening members is adapted to increase the frictional force by applying a tightening force to the bundled strands forming the plurality of members from an outer circumferential side of the covering member,
    wherein the plurality of members includes a free end not fixed to the object so that the plurality of members is cantilevered, and
    wherein the plurality of tightening members is attached to multiple sites of the plurality of members, and one of the multiple sites is at the free end.

3. The vibration damping device as claimed in claim 2, wherein:
    the plurality of tightening members includes three tightening members attached to the plurality of members through the covering member.

* * * * *